US012696361B2

(12) United States Patent
Panjer et al.

(10) Patent No.: US 12,696,361 B2
(45) Date of Patent: Jul. 28, 2026

(54) INTEGRATED CAVITY PLATE SEAL

(71) Applicant: B/E Aerospace, Inc., Winston Salem, NC (US)

(72) Inventors: Frederick Adrian Stephan Panjer, Maarsbergen (NL); Frank Hoogland, Leusden (NL); Roy Dekkers, ER Haarlem (NL); Johannes Joseph Pronk, CS Venhuizen (NL)

(73) Assignee: B/E AREOSPACE, INC., Winston Salem, NC (US)

( * ) Notice: Subject to any disclaimer, the term of this patent is extended or adjusted under 35 U.S.C. 154(b) by 762 days.

(21) Appl. No.: 18/113,849

(22) Filed: Feb. 24, 2023

(65) Prior Publication Data

US 2024/0292501 A1 Aug. 29, 2024

(51) Int. Cl.

*H05B 6/76* (2006.01)
*H05B 6/64* (2006.01)
*H05B 6/74* (2006.01)

(52) U.S. Cl.

CPC ............. *H05B 6/76* (2013.01); *H05B 6/6402* (2013.01); *H05B 6/745* (2013.01)

(58) Field of Classification Search

CPC ........ H05B 6/76; H05B 6/6402; H05B 6/745; F16J 15/02; F16J 15/022; F16J 15/025
USPC .......................................................... 219/738
See application file for complete search history.

(56) References Cited

U.S. PATENT DOCUMENTS

| | | | | |
|---|---|---|---|---|
| 4,249,058 A | | 2/1981 | Lentz et al. | |
| 4,296,297 A | | 10/1981 | Miller | |
| 4,954,680 A | * | 9/1990 | Takenouchi | H05B 6/6426 219/738 |

FOREIGN PATENT DOCUMENTS

| | | | | |
|---|---|---|---|---|
| CN | 1779341 A | | 5/2006 | |
| CN | 201314593 Y | | 9/2009 | |
| GB | 2531579 A | * | 4/2016 | F16J 15/166 |
| JP | S6088498 | | 6/1985 | |
| JP | 1995145944 | | 6/1997 | |
| JP | 2003202116 | | 7/2003 | |

OTHER PUBLICATIONS

European Patent Office, European Search Report dated Jul. 4, 2024 in Application No. 24159515.6.

* cited by examiner

*Primary Examiner* — Nathaniel E Wiehe
*Assistant Examiner* — Daniel S Collins
(74) *Attorney, Agent, or Firm* — SNELL & WILMER L.L.P.

(57) ABSTRACT

A seal for a cavity plate in a microwave oven is described herein. The seal includes a seal body having an outward sealing surface defined around a seal perimeter. The outward sealing surface is configured to seal against inward facing walls of a microwave oven. The seal body also includes an inward sealing surface spaced inward from the outward facing surface. The inward sealing surface is configured to seal against an outer edge of a cavity plate. The seal further includes a plurality of seal supports extending from the seal body on a cavity side of the seal body for maintaining cavity spacing between a bottom microwave oven surface and the seal body.

20 Claims, 4 Drawing Sheets

INTEGRATED CAVITY PLATE SEAL

BACKGROUND

1. Field

The present disclosure relates to aircraft ovens, and more particularly to cavity plates in aircraft microwave ovens.

2. Description of Related Art

Microwave ovens can have a cavity plate upon which the food for cooking is placed. In some configurations, rather than set the food for cooking on a rotating plate, instead there can be a reflective stirrer blade in a cavity below the cavity plate. In aircraft, this cavity plate can present design challenges. For example, the cavity must be sealed but an aircraft microwave oven undergoes pressure changes as the cabin pressure changes during a flight. The sealing on the cavity plate can be compromised as cabin pressure changes. Other aircraft-related issues for the sealing of cavity plates include turbulence, which can displace the cavity plate and compromise the seal.

The conventional techniques have been considered satisfactory for their intended purpose. However, there is an ever present need for improved systems and methods for sealing cavity plates within aircraft microwave ovens. This disclosure provides a solution for this need.

SUMMARY

A seal for a cavity plate in a microwave oven is described herein. The seal includes a seal body having an outward sealing surface defined around a seal perimeter. The outward sealing surface is configured to seal against inward facing walls of a microwave oven. The seal body also includes an inward sealing surface spaced inward from the outward facing surface. The inward sealing surface is configured to seal against an outer edge of a cavity plate. The seal further includes a plurality of seal supports extending from the seal body on a cavity side of the seal body for maintaining cavity spacing between a bottom microwave oven surface and the seal body.

The seal body and seal supports can be of a single material with a first flexibility. The seal body can include for each of the seal supports, a reinforcement member having a second flexibility that is more rigid than the first flexibility. The reinforcement member can be seated in a pocket of the respective seal support. Alternatively, or additionally, the reinforcement member can wrap around the respective seal support.

The seal body can define a plate shape with an aperture therethrough for accommodating blades of a rotating stirrer and the seal body defines a plate shape, where each of the seal supports all extend from one side of the plate shape. The outward facing sealing surface can include a flange extending from a main portion of the seal body in a direction opposite that of the seal supports. The sealing flange can extend about the perimeter of the seal body and can be configured to sealingly engage inward facing walls of a microwave oven.

A cavity plate assembly for a microwave oven can include a plate body and a seal as described above. In the cavity plate assembly, the plate body can be sealed against the inward sealing surface of the seal body.

A microwave oven can include a cooking compartment defined by a plurality of inward facing side walls, an inward facing top wall, and an inward facing bottom wall. The microwave oven also can include a microwave magnetron mounted above the top wall and a stirrer positioned on the bottom wall. The microwave oven can include a cavity plate assembly (e.g. as described above) sealing off a cavity of the cooking compartment housing the stirrer from a main portion of the cooking compartment.

In the microwave oven, the seal body can define a plate shape, where each of the seal supports all extend from one side of the plate shape spanning from the plate body to the bottom wall of the cooking compartment. The outward facing sealing surface can include a flange extending from a main portion of the seal body in a direction opposite that of the seal supports. The sealing flange can extend about the perimeter of the seal body and can be sealingly engaged with inward facing walls of a microwave oven. The sealing engagement can be configured to permit maintenance removal and resealing of the cavity plate assembly without use of adhesives. The microwave oven can include inward projecting dimples extending from at least two of the inward facing sidewalls so that the cavity plate assembly rests on the dimples.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
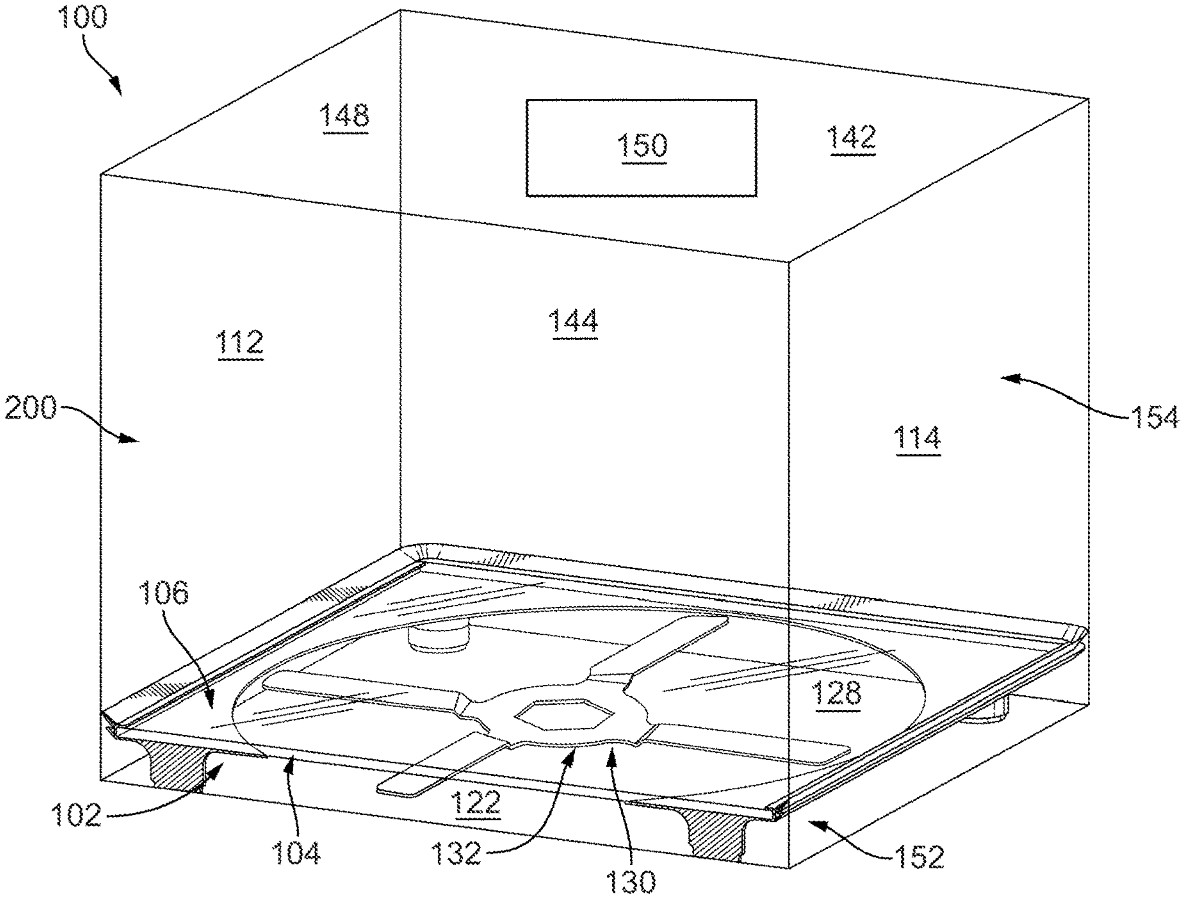
FIG. 1 is a cross-sectional schematic perspective view of an embodiment of a microwave oven constructed in accordance with the present disclosure, showing an integrated cavity plate seal assembly.

Reference will now be made to the drawings wherein like reference numerals identify similar structural features or aspects of the subject disclosure. For purposes of explanation and illustration, and not limitation, a partial view of an embodiment of an aircraft microwave oven in accordance with the disclosure is shown in FIG. 1 and is designated generally by reference character 100. Other embodiments of systems in accordance with the disclosure, or aspects thereof, are provided in FIGS. 2-4, as will be described. The systems and methods described herein can be used to improve cavity plate sealing within an aircraft microwave oven.

Figure 3:
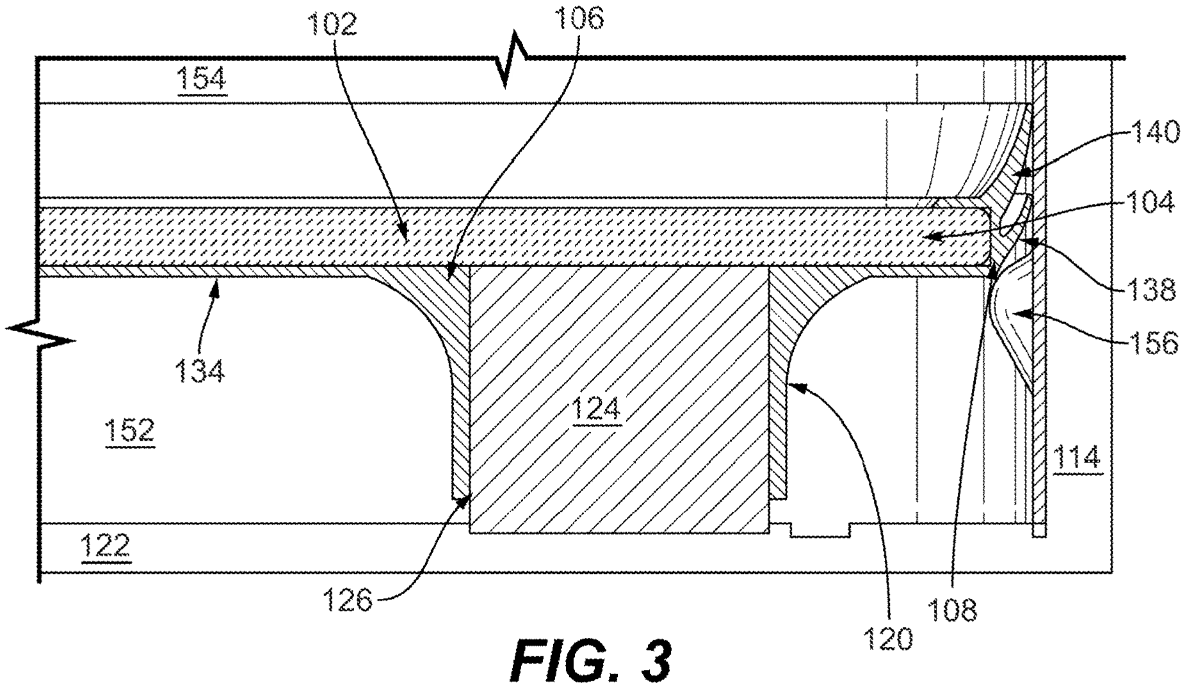
FIG. 3 is an enlarged front cross-sectional view of the cavity plate seal assembly of FIG. 1 showing a seal reinforcement member.

A seal 102 for a cavity plate 104 in a microwave oven 100 is described herein. The seal 102 can include a seal body 106, where the seal body 106 can include an outward sealing surface 108 defined around a seal perimeter 110. The outward sealing surface 108 can be configured to seal against inward facing walls 112, 114, 144, 142 of the microwave oven 100. The seal body 106 can also include an inward sealing surface 116 spaced inward from the outward facing surface 110. The inward sealing surface 116 can be configured to seal against an outer edge 118 of the cavity plate 104 (e.g. as shown in FIG. 3). The seal 102 can also include a plurality of seal supports 120 extending from the seal body 106. The plurality of seal supports 120 can be on a cavity side of the seal body 106 in order to maintain cavity spacing between a bottom microwave oven surface 122 and the seal body 106 (e.g. as shown in FIGS. 3-4).

The seal body 106 can also include, for each of the seal supports 120, a reinforcement member 124. The seal body 106 and seal supports 120 may be made of a single material having a first flexibility, while the reinforcement members 124 may be made of a second material having a second flexibility that is more rigid than the first flexibility of seal body 106 and seal supports 120. In embodiments, the reinforcement member 124 can be seated in a pocket 126 of the respective seal support, for example as shown in FIG. 3. Alternatively, or additionally, the reinforcement member 124 can wrap around the respective seal support 120, for example as shown in FIG. 4.

Figure 2:
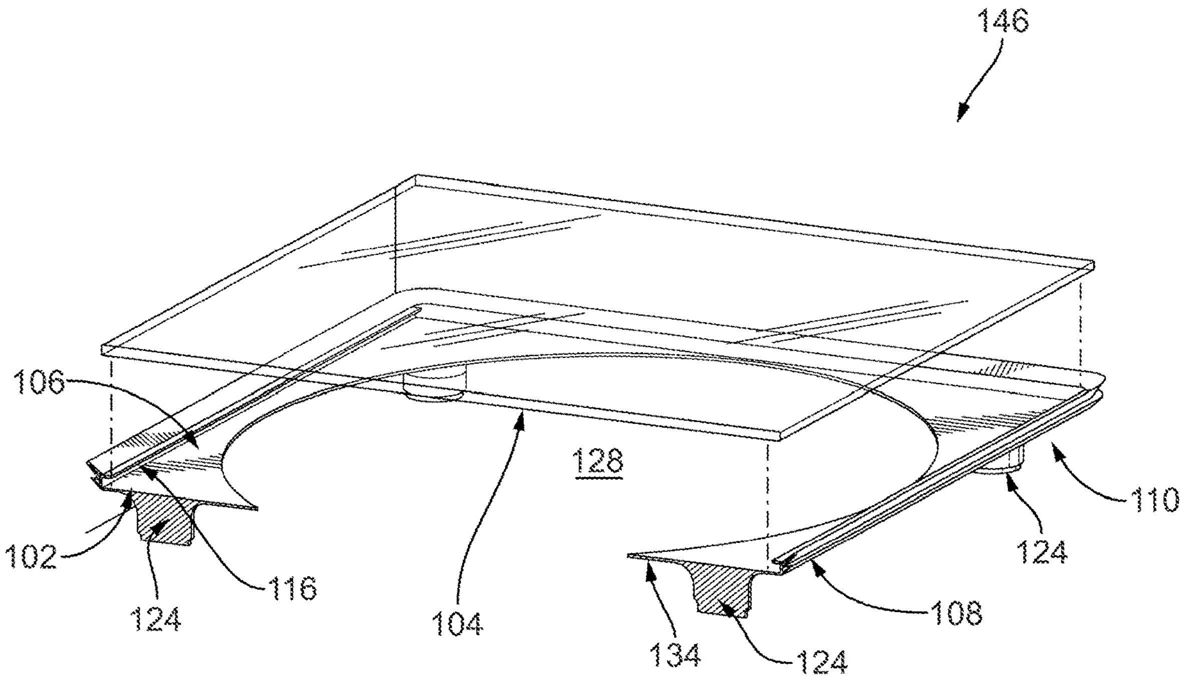
FIG. 2 is an exploded schematic perspective view of the cavity plate seal assembly of FIG. 1.

With continued reference to FIGS. 1-2, the seal body 106 can define a plate shape (e.g. a rectangular plate shape as shown), and an aperture 128 for accommodating blades 130 of a rotating stirrer 132. Each of the seal supports 120 can all extend from one side 134 of the plate shape. For example, as shown, each of the seal supports 120 can extend downward from the side 134 towards the bottom inward facing wall 122 of the microwave oven 100. In use, the seal 102 and plate 104 can a be cavity plate assembly 146 for a microwave oven 100. In the cavity plate assembly 146, the plate body 104 is sealed against the inward sealing surface 116 of the seal body 106.

Figure 4:
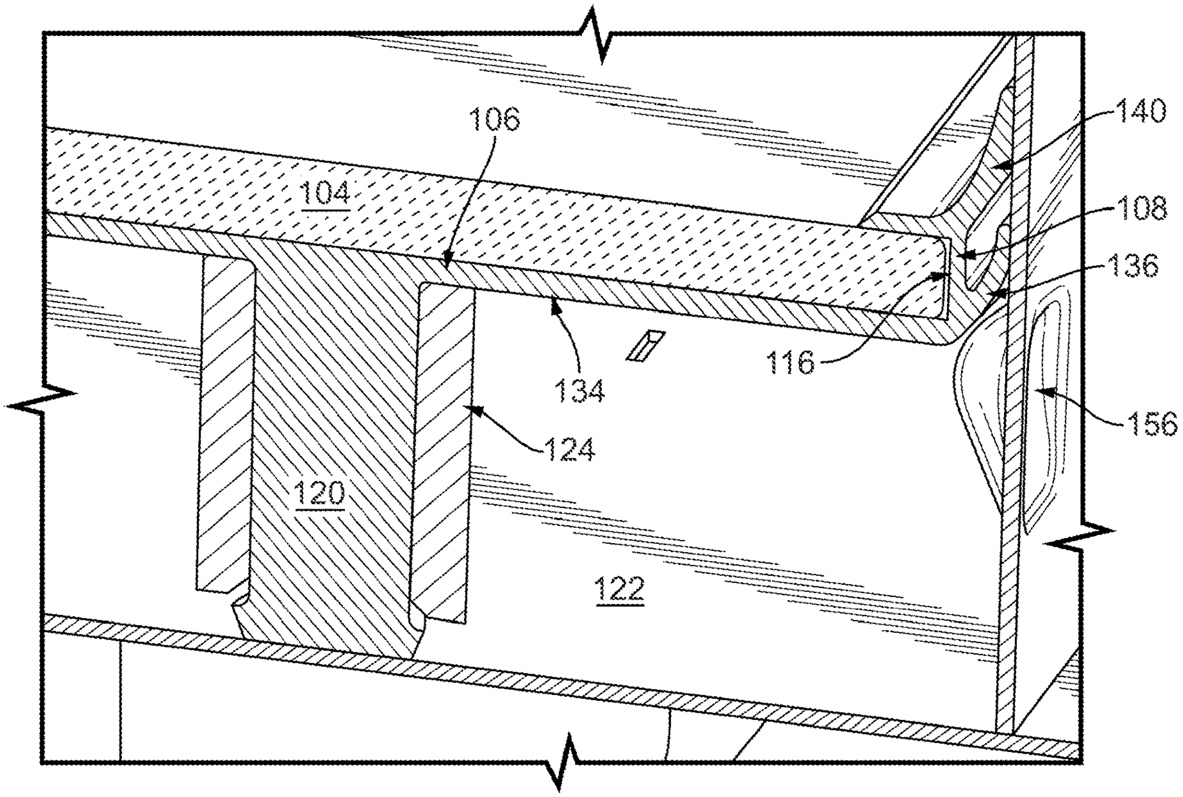
FIG. 4 is an enlarged cross-sectional perspective view of the cavity plate seal assembly of FIG. 1 showing a seal another reinforcement member.

As shown in FIGS. 3-4, the outward facing sealing surface 108 can include at least one flange 136 extending from a main portion 138 of the seal body 106 in a direction opposite that of the seal supports 120. It is also contemplated that the outward facing sealing surface 108 can also include a second sealing flange 140, axially in line with the sealing flange 138. The sealing flange(s) 136,140 can extend outward from the main portion 138 about the entire perimeter 110 of the seal body 106 to sealingly engage the inward facing walls 112, 114, 142, 144 of the microwave oven 100 (e.g. as shown in FIG. 1).

Referring back to FIG. 1, in embodiments, the microwave oven 100 can include a cooking compartment 200 defined by a plurality of inward facing side walls (e.g. walls 112, 114, 142, 144), an inward facing top wall 148, and an inward facing bottom wall (e.g. bottom wall 122). A microwave magnetron 150 can be mounted within the microwave 100, for example above the top wall 148 as shown, however it is also possible that the magnetron 150 may be mounted in the microwave 100 in the cavity 152, or there may be multiple magnetrons 150 mounted above the top wall 148 and in cavity 152. Further a stirrer (e.g. rotating stirrer 130) can be positioned on the bottom wall 122. In operation, the microwave oven 100 includes the cavity plate assembly 146 (e.g. as described above) positioned such that it seals off a cavity 152 of the cooking compartment 200. As shown, the cavity 152 can house the stirrer 130 from a main portion 154 of the cooking compartment 200. Though conventional sealing techniques may require the use of adhesives to seal the cavity plate 104, in the present disclosure, the sealing engagement between the seal 102 and the inner walls 112, 114, 142, and 144 of the microwave oven 100 can be permit maintenance removal and resealing of the cavity plate assembly 146 without the use of adhesives or other tacking methods.

As shown in FIG. 4, the microwave can also include inward projecting dimples 156 extending from at least two of the inward facing sidewalls (e.g. 112 and 114) so that the cavity plate assembly 146 can rest on the dimples 156. While the Figures may only show a single dimple 156, it is appreciated by those skilled in the art that any of the inward facing walls 112, 114, and/or 144 can include at least one dimple 156. The dimples 156 may be optional however, and the seal supports 120 may replace the function of the dimples 156 in the microwave oven 100, therefore although shown in the drawings, it should be understood that dimples 156 are not required for a proper seal and support of the cavity plate 104.

The methods and systems of the present disclosure, as described above and shown in the drawings, provide for improved sealing within aircraft microwave ovens. For example, the cavity plate assembly as described allows for controlled plate positioning, and reduces the risks of vibration induced failures (e.g. turbulence leading to dislocation) even at maximum content load. An integrated cavity plate seal therefore provides the opportunity for smaller cavity plates, which in turn will allow for a more reliable seal design.

While the apparatus and methods of the subject disclosure have been shown and described, those skilled in the art will readily appreciate that changes and/or modifications May be made thereto without departing from the scope of the subject disclosure.

What is claimed is:

1. A seal for a cavity plate in a microwave oven, the seal comprising:

a seal body having an outward sealing surface defined around a seal perimeter, the outward sealing surface being configured to seal against inward facing walls of a microwave oven, and an inward sealing surface spaced inward from the outward facing surface and configured to seal against an outer edge of a cavity plate; and a plurality of seal supports extending from the seal body on a cavity side of the seal body for maintaining cavity spacing between a bottom microwave oven surface and the seal body, wherein the seal body and seal supports are of a single material with a first flexibility and further comprising for each of the seal supports, a reinforcement member having a second flexibility that is more rigid than the first flexibility, wherein the reinforcement member wraps around the respective seal support.

2. The seal as recited in claim 1, wherein the seal body and seal supports are of a single material with a first flexibility and further comprising for each of the seal supports, a reinforcement member having a second flexibility that is more rigid than the first flexibility, wherein the reinforcement member is seated in a pocket of the respective seal support.

3. The seal as recited in claim 1, wherein the seal body defines a plate shape with an aperture therethrough for accommodating blades of a rotating stirrer.

4. The seal as recited in claim 1, wherein the seal body defines a plate shape, wherein the seal supports all extend from one side of the plate shape.

5. The seal as recited in claim 4, wherein the outward facing sealing surface includes a flange extending from a main portion of the seal body in a direction opposite that of the seal supports, wherein the sealing flange extends about the perimeter of the seal body and is configured to sealingly engage inward facing walls of a microwave oven.

6. A cavity plate assembly for a microwave oven, the cavity plate assembly comprising:

- a plate body; and
- a seal as recited in claim 1, wherein the plate body is sealed against the inward sealing surface of the seal body.

7. A microwave oven comprising:

- a cooking compartment defined by a plurality of inward facing side walls, an inward facing top wall, and an inward facing bottom wall;
- a microwave magnetron mounted within the microwave oven;
- a stirrer positioned on the bottom wall; and
- a cavity plate assembly as recited in claim 6 sealing off a cavity of the cooking compartment housing the stirrer from a main portion of the cooking compartment.

8. The microwave oven as recited in claim 7, wherein the seal body and seal supports are of a single material with a first flexibility and further comprising for each of the seal supports, a reinforcement member having a second flexibility that is more rigid than the first flexibility, wherein the reinforcement member is seated in a pocket of the respective seal support.

9. The microwave oven as recited in claim 7, wherein the seal body and seal supports are of a single material with a first flexibility and further comprising for each of the seal supports, a reinforcement member having a second flexibility that is more rigid than the first flexibility, wherein the reinforcement member wraps around the respective seal support.

10. The microwave oven as recited in claim 7, wherein the seal body defines a plate shape with an aperture therethrough for accommodating rotating blades of the stirrer.

11. The microwave oven as recited in claim 7, wherein the seal body defines a plate shape, wherein the seal supports all extend from one side of the plate shape spanning from the plate body to the bottom wall of the cooking compartment.

12. The microwave oven as recited in claim 7, wherein the outward facing sealing surface includes a flange extending from a main portion of the seal body in a direction opposite that of the seal supports, wherein the sealing flange extends about the perimeter of the seal body and is sealingly engaged with inward facing walls of a microwave oven.

13. The microwave oven as recited in claim 12, wherein the sealing engagement is configured to permit maintenance removal and resealing of the cavity plate assembly without use of adhesives.

14. The microwave oven as recited in claim 7, further comprising inward projecting dimples extending from at least two of the inward facing sidewalls, wherein the cavity plate assembly rests on the dimples.

15. A seal for a cavity plate in a microwave oven, the seal comprising:

- a seal body having an outward sealing surface defined around a seal perimeter, the outward sealing surface being configured to seal against inward facing walls of a microwave oven, and an inward sealing surface spaced inward from the outward facing surface and configured to seal against an outer edge of a cavity plate, wherein the seal body defines a plate shape with an aperture therethrough for accommodating blades of a rotating stirrer; and
- a plurality of seal supports extending from the seal body on a cavity side of the seal body for maintaining cavity spacing between a bottom microwave oven surface and the seal body.

16. A microwave oven comprising:

- a cooking compartment defined by a plurality of inward facing side walls, an inward facing top wall, and an inward facing bottom wall;
- a microwave magnetron mounted within the microwave oven;
- a stirrer positioned on the bottom wall; and
- a cavity plate assembly comprising a plate body and a seal having:
  - a seal body with an outward sealing surface defined around a seal perimeter, the outward sealing surface being configured to seal against inward facing walls of a microwave oven, and an inward sealing surface spaced inward from the outward facing surface and configured to seal against an outer edge of a cavity plate, and
  - a plurality of seal supports extending from the seal body on a cavity side of the seal body for maintaining cavity spacing between a bottom microwave oven surface and the seal body,
  - wherein the seal body and seal supports are of a single material with a first flexibility and further comprising for each of the seal supports, a reinforcement member having a second flexibility that is more rigid than the first flexibility,
  - wherein the reinforcement member wraps around the respective seal support, and
  - wherein the cavity plate seals off a cavity of the cooking compartment housing the stirrer from a main portion of the cooking compartment.

17. The microwave oven of claim 16, wherein the seal body defines a plate shape with an aperture therethrough for accommodating rotating blades of the stirrer.

18. The microwave oven of claim 16, wherein the seal body defines a plate shape, wherein the seal supports all extend from one side of the plate shape spanning from the plate body to the bottom wall of the cooking compartment.

19. The microwave oven as recited in claim 16, wherein the outward facing sealing surface includes a flange extending from a main portion of the seal body in a direction opposite that of the seal supports, wherein the sealing flange extends about the perimeter of the seal body and is sealingly engaged with inward facing walls of a microwave oven.

20. The microwave oven as recited in claim 19, wherein the sealing engagement is configured to permit maintenance removal and resealing of the cavity plate assembly without use of adhesives.

* * * * *